J. N. JUDSON.
DOUGHNUT COOKING MACHINE.
APPLICATION FILED MAY 3, 1920.
1,429,904.
Patented Sept. 19, 1922.
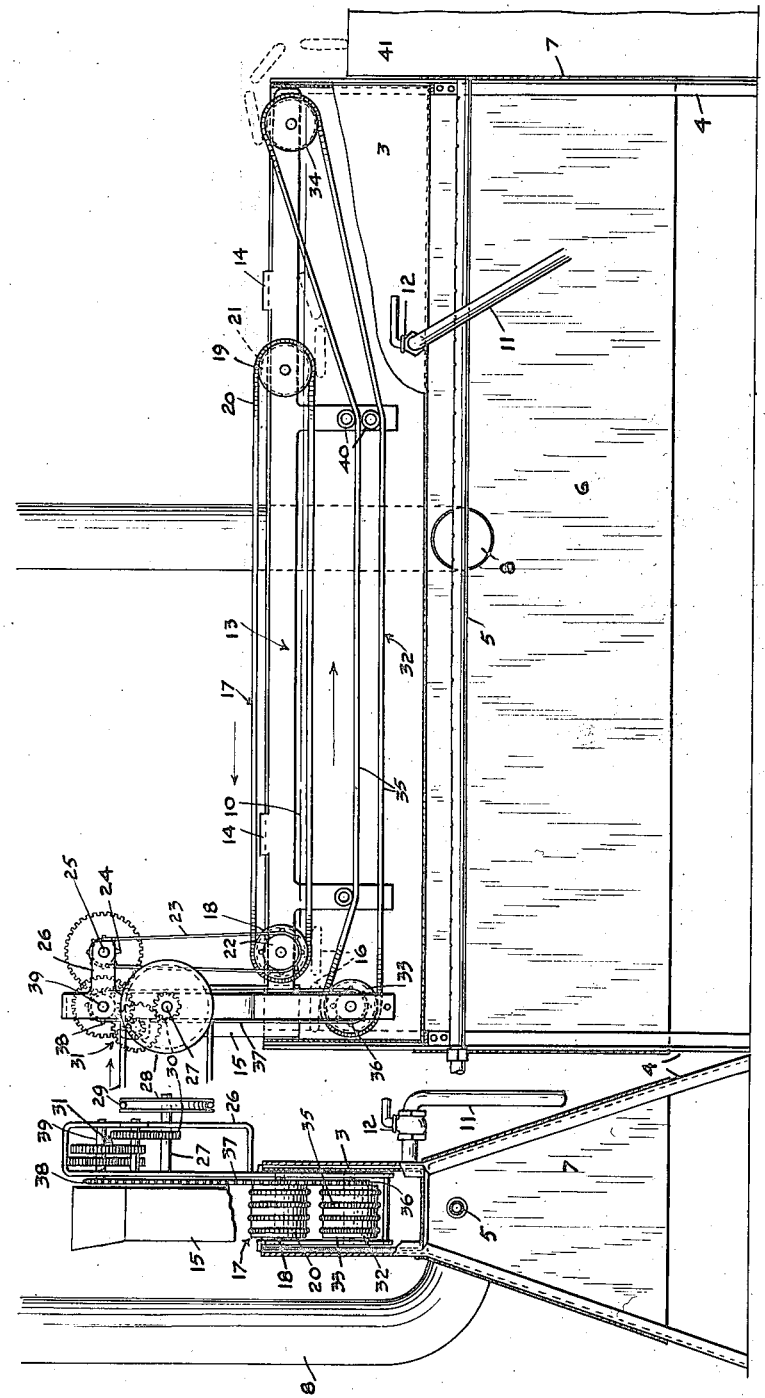
INVENTOR
J. N. JUDSON
BY
ATT'YS Patented Sept. 19, 1922.

1,429,904

UNITED STATES PATENT OFFICE.

JOHN N. JUDSON, OF OAKLAND, CALIFORNIA.

DOUGHNUT-COOKING MACHINE.

Application filed May 3, 1920. Serial No. 378,399.

*To all whom it may concern:*

Be it known that I, JOHN N. JUDSON, a citizen of the United States, residing at Oakland, in the county of Alameda and State of California, have invented new and useful Improvements in Doughnut-Cooking Machines, of which the following is a specification.

The object of this invention is to provide a simply constructed, small, compact and relatively inexpensive machine which may be easily and cheaply operated to uniformly cook large quantities of doughnuts in a comparatively short time.

The invention possesses other advantages and features, some of which, with the foregoing, will be set forth at length in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claims may be embodied in a plurality of forms.

Figure 1 is a longitudinal sectional view of the machine, showing parts in side elevation.

Figure 2 is an end elevation of the machine with parts removed, broken away and in section, to show the interior of the machine.

In the drawings, 3 designates an elongated cooking vat or receptacle which is supported horizontally upon standards 4. Mounted under and extending for the length of the vat is a gas burner 5. This burner is enclosed by plates 6 and 7 secured to and depending from the sides and ends of the vats and to the standards 4. A flue 8 is connected with one of the plates 6 and is arranged to carry off the products of combustion of the burner.

The vat is filled with cooking oil up to the level indicated by the lines 10. A suitable drain pipe 11 having a valve 12 is connected with the vat 3.

Means for feeding doughnuts to the vat and for moving them through the cooking oil is supported in a skeleton frame 13 which frame is suspended from lugs 14 that engage the upper edges of the vat. This frame extends into the vat through the upper open side thereof and may be lifted with the above named means out of the vat when it is desired to clean the vat. Mounted in the frame at one end thereof is doughnut forming means including a chute or hopper 15 which hopper extends into the vat and feeds doughnuts as shown at 16 into the oil at one end of the vat.

An endless conveyer 17 constitutes means for moving the doughnuts through the oil to cook them. This conveyor comprises rollers 18 and 19 journalled in the upper part of the frame 13 so as to extend below the level of the cooking oil. Mounted on these rollers are several wire cables 20 which work in grooves 21 in the rollers and are slightly spaced apart but arranged to maintain the doughnuts submerged in the oil. The lower runs of these cables are submerged. The roller 18 has a sprocket 22, thereon upon which sprocket a chain 23 is carried. This chain is mounted upon a sprocket 24 secured to a shaft 25 in an upward extension 26 of the frame 13. A shaft 27 is journalled in the extension 26 of the frame 13 and is driven by a pulley 28 thereon, which pulley is operated by a belt 29 operated from a suitable source of power, not shown. The shaft 27 carries a small pinion 30 which through suitable reducing gearing 31 drives the shaft 25 and sprocket 24 whereby the endless conveyor 17 is operated.

An endless conveyor 32 is mounted in the frame 13 for the most part below the conveyor 17 and is constructed similarly to the conveyor 17, being made up of rollers 33 and 34 and cables 35. The roller 33 is disposed below the lower end of the chute and has a sprocket 36 thereon. A chain 37 is mounted on this sprocket and upon a sprocket 38 fixed to a shaft 39 in the extension 26 of the frame 13. This shaft is driven by the gearing 31 at such speed that the conveyor 32 is moved in the opposite direction to the conveyor 17 and approximately three times as fast.

The roller 34 of the conveyor 32 is mounted in line with the roller 19 at the adjacent end of the vat 3. The cables 35 extend under idlers 40 on the frame 13 at a point under the roller 19 so that the upper run of the conveyor at one end of the vat is inclined upwardly, extends beyond the conveyor and will carry the doughnuts out of the vat and drop them into a container 41 at one end of the vat.

The machine is operated as follows:—

The burner 5 is lighted and the oil in the vat 3 brought to the boiling point. Doughnuts are then fed into the oil through the chute or hopper 15 and will first sink until they strike upon the upper side of the lower conveyor and then as they are carried forward by the conveyor, will, due to the fact that they have been made lighter as to specific gravity by the action of the hot cooking fluid, assume the floating position shown at 16 in Figure 1. The conveyor 32 in being directly under the doughnut chute 15 prevents the doughnuts from sinking too far into the oil and in rotating more rapidly than the conveyor 17, will quickly move the doughnuts under the conveyor 17. The conveyor 17 rotates slowly so as to advance the doughnuts slowly through the oil. This movement may be timed as desired, and is such that a doughnut having been moved a distance through the oil equal to the length of the conveyor 17, is thoroughly cooked. The doughnuts are held submerged by the conveyor 17 which latter is so disposed that the buoyancy of the doughnuts causes them to bear upwardly upon the cables 20 of the conveyor. As the doughnuts move past the outer end of the conveyor they come into contact with the upwardly inclined end portion of the conveyor 32 and are carried out of the liquid in the vat on said conveyor 32, and drop into the receptacle 41 as shown diagrammatically in Figure 1. By having the conveyor belts formed of spaced wire cables the oil will freely circulate around the doughnuts and insure a thorough and uniform cooking thereof. As the conveyor 32 moves three times as fast as the one 17 the doughnuts will be very quickly moved out of the tank as compared to their slow movement while being passed through the oil. The doughnuts are fed into the vat one at a time and the conveyor is of a sufficient width to hold one row of doughnuts. This prevents the doughnuts from scattering and causes a row of doughnuts in single file to be advanced through the cooking fluid.

I claim:—

1. A doughnut cooking machine comprising a receptacle containing a cooking fluid, an endless conveyor for the most part submerged in said fluid and having one end extending above the level of the fluid, means for dropping uncooked doughnuts into the receptacle so that the doughnuts will in sinking contact with the submerged end of the conveyor and be moved forwardly thereby and means into contact with which the doughnuts are moved by the conveyor for moving the uncooked doughnuts submerged through the fluid to a point where the doughnuts will contact with the portion of the first-named conveyor which extends above the level of the fluid.

2. A doughnut cooking machine comprising a receptacle containing a cooking fluid, means for dropping uncooked doughnuts into the receptacle, means for moving doughnuts submerged through the fluid in the said receptacle, and means which moves the doughnuts into contact with the second named means and which after the doughnuts have been moved through the fluid by the second named means operate to move the doughnuts out of said fluid.

JOHN N. JUDSON.